United States Patent
Arai et al.

(10) Patent No.: US 7,308,873 B2
(45) Date of Patent: Dec. 18, 2007

(54) VARIABLE VALVE CONTROL SYSTEM FOR INTERNAL COMBUSTION ENGINE

(75) Inventors: Masahiro Arai, Yokohama (JP); Katsuhiko Kawamura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 440 days.

(21) Appl. No.: 11/106,448

(22) Filed: Apr. 15, 2005

(65) Prior Publication Data

US 2005/0229883 A1 Oct. 20, 2005

(30) Foreign Application Priority Data

Apr. 15, 2004 (JP) ............................. 2004-119797

(51) Int. Cl.
*F01L 1/34* (2006.01)
(52) U.S. Cl. ............................... 123/90.16; 123/90.15; 123/346
(58) Field of Classification Search ............. 123/90.15, 123/90.16, 90.17, 90.18, 345, 346, 347, 348
See application file for complete search history.

(56) References Cited

U.S. PATENT DOCUMENTS 6,938,593 B2 * 9/2005 Magner et al. .......... 123/90.16

FOREIGN PATENT DOCUMENTS

| JP | 11-107725 A | 4/1999 |
|---|---|---|
| JP | 2002-349215 A | 12/2002 |
| JP | 2003-41955 A | 2/2003 |

OTHER PUBLICATIONS

U.S. Appl. No. 11/084,360, filed Mar. 21, 2005, Arai et al.

* cited by examiner

*Primary Examiner*—Ching Chang
(74) *Attorney, Agent, or Firm*—Foley & Lardner LLP

(57) ABSTRACT

A variable valve control system for an internal combustion engine, includes a valve to open and close an opening of a combustion chamber of the engine, a variable lift characteristic control mechanism to adjust a valve lift characteristic of the valve, a sensing section to collect information needed to determine an estimated valve lift characteristic of the valve, an input section to receive an externally input calibration-mode command. The variable valve control system is configured to perform: controlling the valve lift characteristic to be a mechanically defined small setting in response to the calibration-mode command; collecting the information when the valve lift characteristic is the small setting; and calibrating the sensing section in accordance with the collected information.

22 Claims, 4 Drawing Sheets

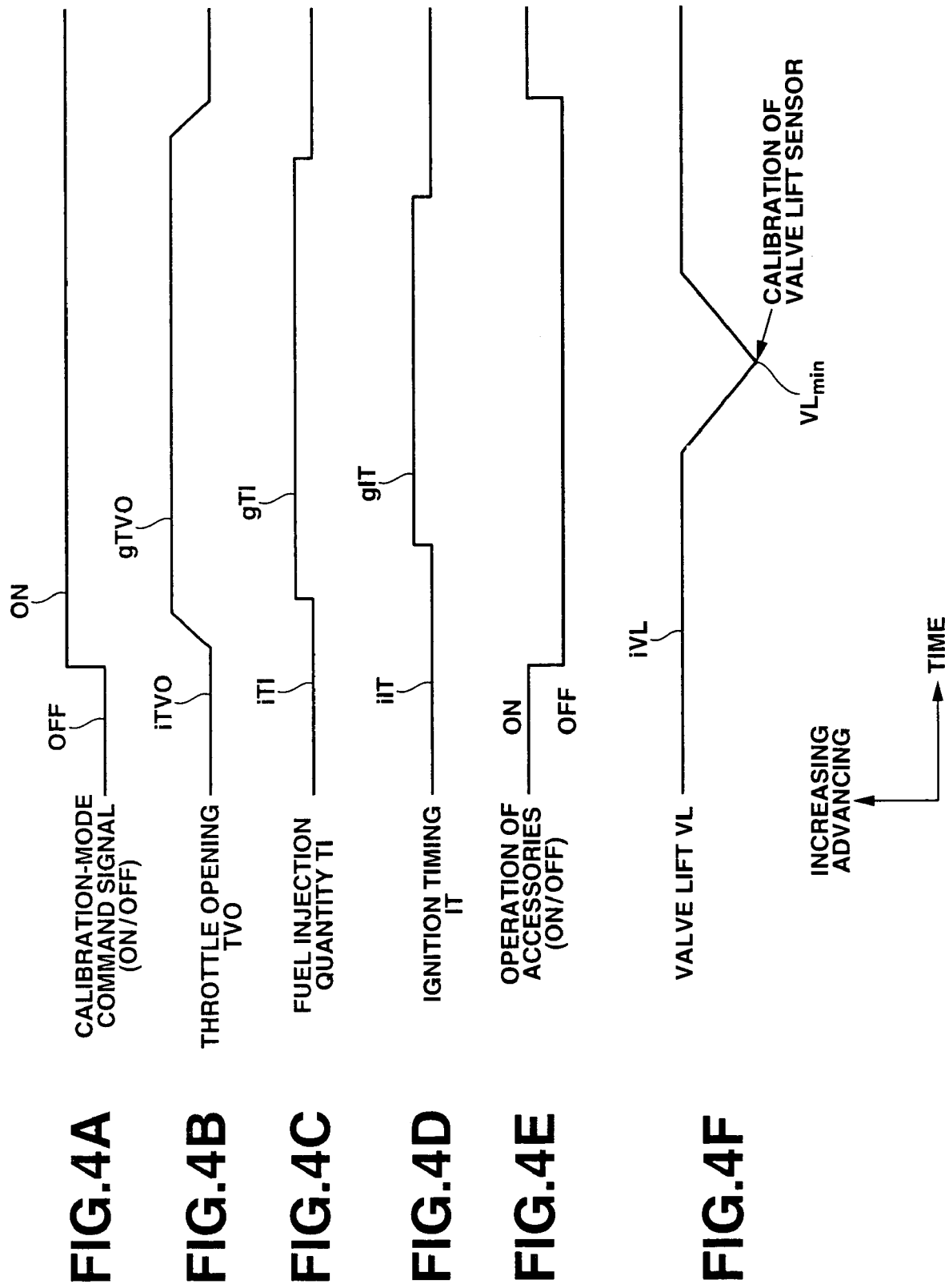

VARIABLE VALVE CONTROL SYSTEM FOR INTERNAL COMBUSTION ENGINE

BACKGROUND OF THE INVENTION

The present invention relates generally to variable valve control systems for internal combustion engines which are capable of continuously varying a lift characteristic (a lift and a working angle) of an intake valve or an exhaust valve, and more particularly to a variable valve control system which is capable of calibrating a sensor for measuring the lift characteristic.

In recent years, there have been proposed and developed various variable valve control systems enabling both a working angle (an operating angle) and a phase to be varied for a high degree of freedom of valve lift characteristics and enhanced engine performance through all engine operating conditions. The variable valve control systems are applied to internal combustion engines, especially to gasoline engines which generate output power in accordance with the quantity of intake air, in order to enhance engine performance such as fuel economy. Some variable valve control systems include a variable lift and working angle control mechanism to continuously expand or contract a valve lift and a working angle of an intake valve, and a variable phase control mechanism to retard or advance the angular phase at the maximum intake-valve lift point (often called "central-angle phase"). Such a variable valve control system is capable of controlling the quantity of intake air flowing into a combustion chamber of each of the cylinders without the control of the opening of a throttle valve. Such variable valve control systems have been disclosed in Japanese Patent Provisional Publications Nos. 2002-349215 (hereinafter is referred to as "JP2002-349215") and 2003-41955 (hereinafter is referred to as "JP2003-41955"). In the systems disclosed in JP2002-349215 and JP2003-41955, the variable actuation mechanism continuously changes the valve lift characteristic in accordance with the angular position of a control shaft. In order to precisely control the valve lift characteristic, the variable valve control system includes a control shaft sensor to detect the angular position of the control shaft. The variable valve control system calibrates the control shaft sensor by correcting information concerning a reference position for measuring and outputting the angular position of the control shaft. The calibration is executed in a condition where the control shaft is in a mechanical limit position defined by a stopper, and a torque necessary to drive the valve train is small. That is, the calibration is executed while the lift characteristic is a mechanically defined minimum lift.

SUMMARY OF THE INVENTION

In order to precisely control the control shaft by a closed-loop control or a feedback control using the detected angular position of the control shaft, the variable valve control system employs a range of the angular position of the control shaft apart from the mechanically defined minimum lift, which ensures a margin of the control. The position at the lower mechanical limit is not used during the engine operating in normal operating conditions. In the system disclosed in JP2002-349215, the calibration operation is performed while the engine is operating at idle or in very low load conditions. Regulating the control shaft to the lower mechanical limit position while the engine is at idle or operating in very low load conditions results in instability in the intake-air quantity and thereby in instability in the combustion. In the system disclosed in JP2003-41955, the calibration operation is performed while the engine is restarting, or while the engine is stopping by turning the ignition switch to OFF or by an engine stall. That is, the calibration operation is performed in a condition where the rotation speed of the crankshaft is zero or an ultrasmall speed. Actually, this makes it difficult to rotate the control shaft to the lower mechanical limit position, because the friction or the necessary torque is large in these conditions.

Accordingly, it is an object of the present invention to provide a variable valve control system for an internal combustion engine which is capable of continuously varying a lift characteristic of an intake valve or an exhaust valve, and of calibrating in a reliable and stable manner a sensor for estimating the valve lift characteristic.

According to one aspect of the present invention, a variable valve control system for an internal combustion engine, comprises: a valve to open and close an opening of a combustion chamber of the engine; a variable lift characteristic control mechanism to adjust a valve lift characteristic of the valve; a sensing section to collect information needed to determine an estimated valve lift characteristic of the valve; an input section to receive an externally input calibration-mode command; and a control unit in operative communication with the variable lift characteristic control mechanism, the sensing section, and the input section, to perform the following: controlling the valve lift characteristic to be a mechanically defined small setting in response to the calibration-mode command; collecting the information when the valve lift characteristic is the small setting; and calibrating the sensing section in accordance with the collected information.

According to another aspect of the present invention, a variable valve control system for an internal combustion engine, comprises: a valve to open and close an opening of a combustion chamber of the engine; a variable lift characteristic control mechanism to adjust a valve lift characteristic of the valve; a sensing section to collect information needed to determine an estimated valve lift characteristic of the valve; an input section to receive an externally input calibration-mode command; and a control unit in operative communication with the variable lift characteristic control mechanism, the sensing section, and the input section, to operate the engine in a calibration mode in response to the calibration-mode command, and to perform the following in the calibration mode: controlling the valve lift characteristic to be a mechanically defined small setting; collecting the information when the valve lift characteristic is the small setting; and calibrating the sensing section in accordance with the collected information.

According to a further aspect of the present invention, a variable valve control system for an internal combustion engine, comprises: a valve to open and close an opening of a combustion chamber of the engine; variable lift characteristic control means for adjusting a valve lift characteristic of the valve; sensing means for collecting information needed to determine an estimated valve lift characteristic of the valve; input means for receiving an externally input calibration-mode command; and control means in operative communication with the variable lift characteristic control means, the sensing means, and the input section, for performing the following: controlling the valve lift characteristic to be a mechanically defined small setting in response to the calibration-mode command; collecting the information when the valve lift characteristic is the small setting; and calibrating the sensing means in accordance with the collected information.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 4A is a time chart depicting a change in a calibration-mode command signal during the process of FIG. 3.

FIG. 4B is a time chart depicting a change in a throttle opening TVO during the process of FIG. 3.

FIG. 4C is a time chart depicting a change in a fuel injection quantity TI during the process of FIG. 3.

FIG. 4D is a time chart depicting a change in an ignition timing IT during the process of FIG. 3.

FIG. 4E is a time chart depicting a change in an operational status of accessories during the process of FIG. 3.

FIG. 4F is a time chart depicting a change in an intake valve lift VL during the process of FIG. 3.

DETAILED DESCRIPTION OF THE INVENTION

Figure 2:
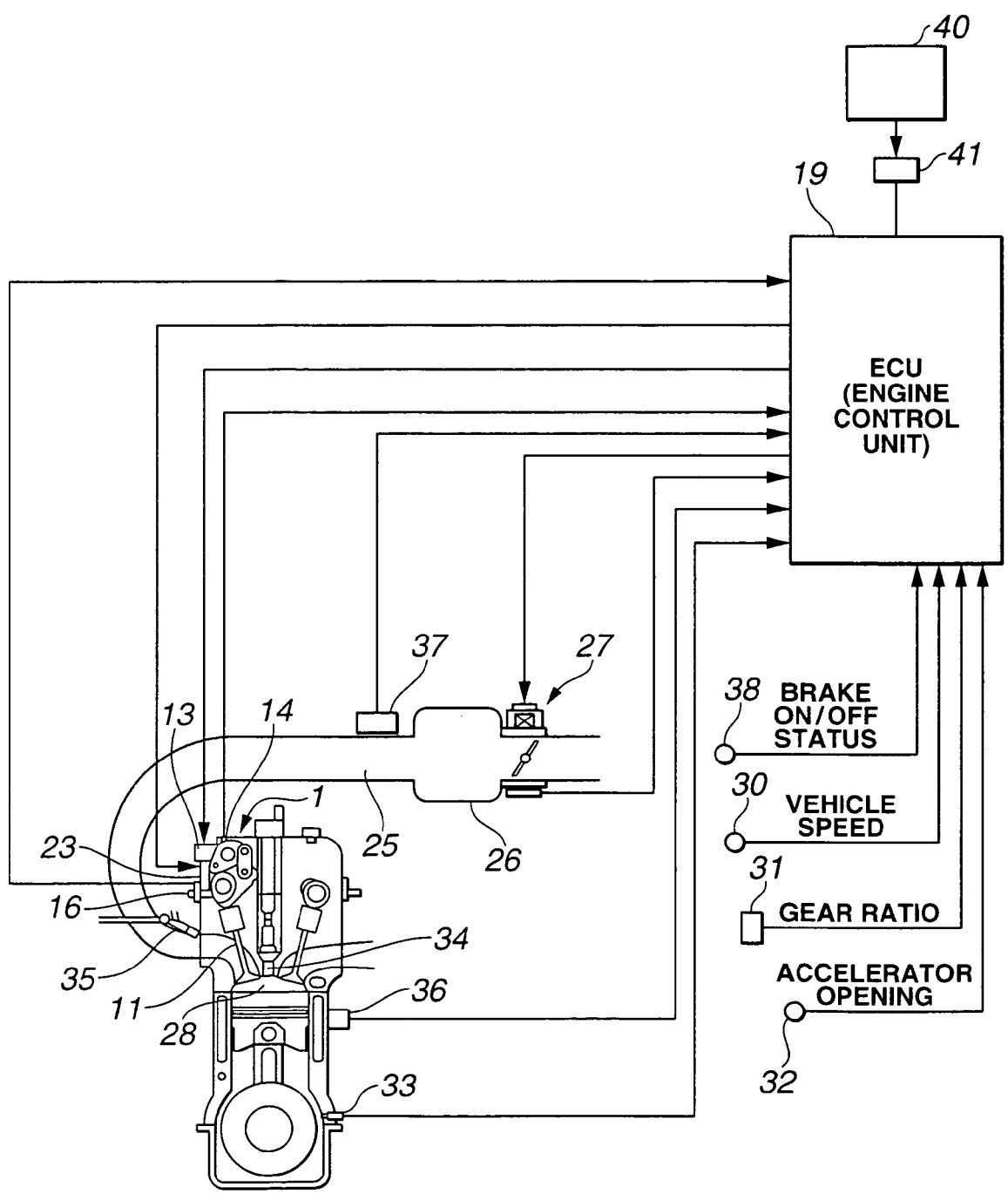
FIG. 2 is a system block diagram depicting an internal combustion engine including the variable valve control system of FIG. 1 in accordance with the embodiment of the present invention.

Referring now to the drawings, particularly to FIG. 2, the variable valve control system of the embodiment is exemplified in an automotive in-line four-cycle spark-ignited gasoline engine with a pair of intake valves 11 and a pair of exhaust valves in each cylinder. However, the present invention is also applicable to an internal combustion engine with other cylinder arrangement such as a V-type engine. As shown in FIG. 2, a variable valve actuation mechanism is provided to actuate intake valves 11 so that an intake-valve lift characteristic is variable as fully described later. On the other hand, a valve actuation mechanism for exhaust valves is constructed as a direct-operated valve actuation mechanism so that the exhaust valves are driven directly by an exhaust camshaft. An exhaust-valve lift characteristic is fixed (constant).

Figure 1:
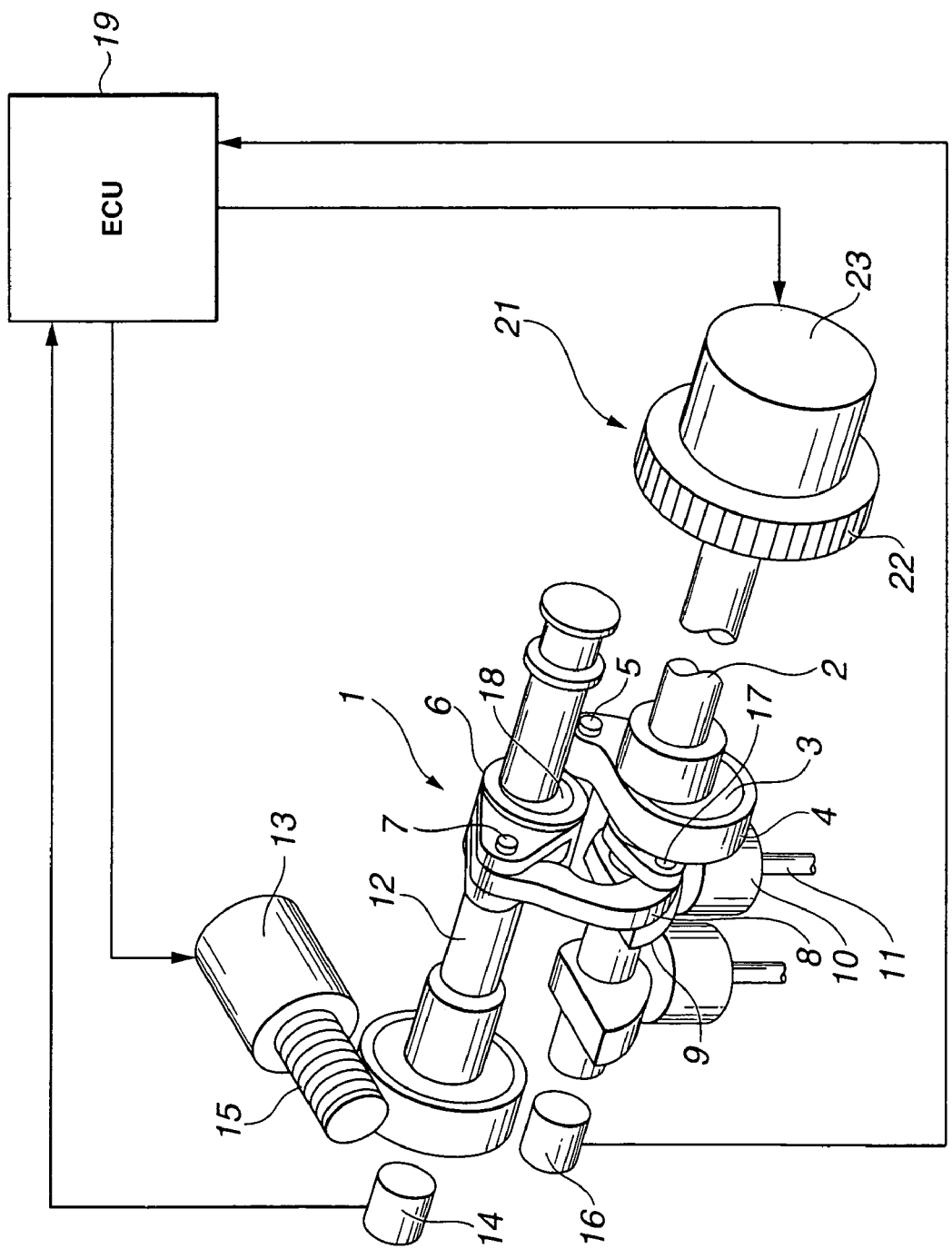
FIG. 1 is a perspective view depicting a variable valve control system including a variable lift and working-angle control mechanism and a variable phase control mechanism in accordance with an embodiment of the present invention.

The variable valve actuation mechanism is known per se, as disclosed in Japanese Patent Provisional Publication No. H11(1999)-107725. The entire contents of this Japanese Patent Provisional Publication No. H11(1999)-107725 are hereby incorporated by reference. Referring now to FIG. 1, there is shown the detailed construction of the variable valve actuation mechanism. As seen from the perspective view of FIG. 1, the variable valve actuation mechanism includes a variable lift and working-angle control mechanism (a variable lift characteristic control mechanism) 1 and a variable phase control mechanism 21, combined to each other. Variable lift and working-angle control mechanism 1 is provided to continuously adjust a valve lift characteristic of intake valve 11 of each of the cylinders, that is, to continuously change a valve lift and a working angle of intake valve 11 of each of the cylinders. On the other hand, variable phase control mechanism 21 is provided to continuously adjust an intake-valve phase of intake valve 11 of each of the cylinders, that is, to continuously change (advance or retard) an angular phase at the maximum intake-valve lift point, that is, a central-angle phase, with respect to an angular position of the crankshaft.

Variable lift and working-angle control mechanism 1 includes intake valve 11 slidably installed on the cylinder head, a hollow drive shaft 2 rotatably supported by a cam bracket (not shown) mounted on the upper portion of the cylinder head, a drive eccentric cam 3 press-fitted onto drive shaft 2, a control shaft 12 having an eccentric cam portion 18 whose axis is eccentric to the axis of control shaft 12, which is located above the drive shaft 2, rotatably supported by the same cam bracket, and arranged in parallel with drive shaft 2, a valve rocker arm 6 rockably supported on the eccentric cam portion 18 of control shaft 12, and a rockable cam 9 in sliding-contact with a valve lifter (a tappet) 10 of intake valve 11.

Drive eccentric cam 3 is mechanically linked to valve rocker arm 6 via a link arm 4. Valve rocker arm 6 is mechanically linked to rockable cam 9 via a link member 8. Drive shaft 2 is driven by the engine crankshaft via a timing chain or a timing belt. Drive eccentric cam 3 has a cylindrical outer peripheral surface. The axis of drive eccentric cam 3 is eccentric to the axis of drive shaft 2 by a predetermined eccentricity. The inner periphery of an annular portion of link arm 4 is rotatably fitted onto the cylindrical outer periphery of drive eccentric cam 3. The substantially central portion of valve rocker arm 6 is rockably supported by the eccentric cam portion 18 of control shaft 12. One end of valve rocker arm 6 is mechanically linked to or pin-connected to an armed portion of link arm 4 via a connecting pin 5. The other end of valve rocker arm 6 is mechanically linked to or pin-connected to the upper end of link member 8 via a connecting pin 7. As discussed above, the axis of eccentric cam portion 18 is eccentric to the axis of control shaft 12 by a predetermined eccentricity. Thus, the center of oscillating motion of valve rocker arm 6 changes depending upon the angular position of control shaft 12.

Rockable cam 9 is rotatably fitted onto the outer periphery of drive shaft 2. One end of rockable cam 9, extending in the direction normal to the axis of drive shaft 2, is linked to or pin-connected to the lower end of link member 8 via a connecting pin 17. Rockable cam 9 is formed on its lower surface with a base-circle surface portion being concentric to drive shaft 2 and a moderately-curved cam surface portion being continuous with the base-circle surface portion. The base-circle portion and the cam surface portion of rockable cam 9 are designed to be brought into abutted-contact (or sliding-contact) with a designated point of the upper face of valve lifter 10 of intake valve 11, depending on an angular position of rockable cam 9 oscillating. In this manner, the base-circle surface portion serves as a base-circle section within which an intake-valve lift is zero. On the other hand, a predetermined angular range of the cam surface portion, being continuous with the base-circle surface portion, serves as a ramp section. Additionally, a predetermined angular range of the cam nose portion being continuous with the ramp section, serves as a lift section.

As shown in FIG. 1, control shaft 12 of variable lift and working-angle control mechanism 1 is actuated within a predetermined angular range by means of a lift and working-angle control actuator 13. In the shown embodiment, variable lift and working-angle control actuator 13 is comprised of a servo motor, a worm gear 15 serving as an output shaft of the servo motor, a worm wheel in meshed-engagement with worm gear 15 and fixedly connected to the outer periphery of control shaft 12. The operation of the servo motor of variable lift and working-angle control actuator 13 is electronically controlled in response to a control signal from an electronic engine control unit (ECU) 19. In order to measure, or determine the angular position of control shaft 12, a is control shaft sensor (a valve lift sensor) 14 is located nearby control shaft 12. Control shaft sensor 14 collects information needed to determine an estimated valve lift characteristic of intake valve 11. Actually, a controlled pressure applied to variable lift and working-angle control actuator 13 is regulated or modulated by way of a first hydraulic control module (not shown), which is responsive to a control signal from ECU 19. Variable lift and working-angle control actuator 13 is designed so that the angular position of the output shaft (worm gear 15) is forced toward and held at its initial angular position by means of a return spring with the first hydraulic control module de-energized. Variable lift and working-angle control mechanism 1 operates as follows.

During rotation of drive shaft 2, link arm 4 moves up and down by virtue of cam action of drive eccentric cam 3. The up-and-down motion of link arm 4 causes the oscillating motion of valve rocker arm 6. The oscillating motion of valve rocker arm 6 is transmitted via link member 8 to rockable cam 9 with the result that rockable cam 9 oscillates. By virtue of the cam action of rockable cam 9 oscillating, valve lifter 10 of intake valve 11 is pushed and thus intake valve 11 lifts. When the angular position of control shaft 12 is varied by variable lift and working-angle control actuator 13, an initial position of valve rocker arm 6 varies and as a result an initial position (or a starting point) of the oscillating motion of rockable cam 9 also varies.

Assuming that the angular position of the eccentric cam portion 18 of control shaft 12 is shifted from a first angular position that the axis of eccentric cam portion 18 is located just under the axis of control shaft 12 to a second angular position that the axis of eccentric cam portion 18 is located just above the axis of control shaft 12, valve rocker arm 6 as a whole shifts upwards. As a result, the end portion of rockable cam 9, including a hole for connecting pin 17, is relatively pulled upwards. That is, the initial position of rockable cam 9 is shifted such that the rockable cam itself is inclined in a direction that the cam surface portion of rockable cam 9 moves apart from intake-valve valve lifter 10. With valve rocker arm 6 shifted upwards, when rockable cam 9 oscillates during rotation of drive shaft 2, the base-circle surface portion of rockable cam 9 is held in contact with valve lifter 10 for a comparatively long time period. In other words, a time period during which the cam surface portion of rockable cam 9 is held in contact with valve lifter 10 becomes short. As a consequence, a valve lift of intake valve 11 becomes short. Additionally, a working angle (i.e., a lifted period) from intake-valve open timing IVO to intake-valve closure timing IVC becomes reduced.

Conversely, when the angular position of the eccentric cam portion 18 of control shaft 12 is shifted from the second angular position to the first angular position, valve rocker arm 6 as a whole shifts downwards. As a result of this, the end portion of rockable cam 9, including the hole for connecting pin 17, is relatively pulled downwards. That is, the initial position of rockable cam 9 is shifted such that the rockable cam itself is inclined in a direction that the cam surface portion of rockable cam 9 moves towards intake-valve valve lifter 10. With valve rocker arm 6 shifted downwards, when rockable cam 9 oscillates during rotation of drive shaft 2, a portion, which is brought into contact with intake-valve valve lifter 10, is somewhat shifted from the base-circle surface portion of rockable cam 9 to the cam surface portion of rockable cam 9. As a consequence, a valve lift of intake valve 11 becomes large. Additionally, the working angle from intake-valve open timing IVO to intake-valve closure timing IVC becomes extended.

The angular position of the eccentric cam portion 18 of control shaft 12 can be continuously varied within limits by means of variable lift and working-angle control actuator 13, and thus the valve lift characteristic (the valve lift and the working angle) also vary continuously. That is, variable lift and working-angle control mechanism 1 shown in FIG. 1 can scale up and down both the valve lift and the working angle continuously simultaneously. In other words, in accordance with a change in the valve lift and a change in the working angle, occurring simultaneously, it is possible to vary intake-valve open timing IVO and intake-valve closure timing IVC symmetrically with each other.

Drive shaft 2 and rockable cam 9 of variable lift and working-angle control mechanism 1 can be located in a substantially same position in an engine as a camshaft and a fixed cam of a typical direct-acting valve train. In addition, the constituent elements of variable lift and working-angle control mechanism 1 can be gathered and disposed near around drive shaft 2. Accordingly, variable lift and working-angle control mechanism 1 is constructed to be compact to be easily mounted on an engine. Variable lift and working-angle control mechanism 1 can be mounted on a conventional engine by adding small design change to the engine. In variable lift and working-angle control mechanism 1, most of the connection points between the link elements, such as the bearing between control eccentric cam 18 and valve rocker arm 6, are in face-to-face contact. In addition, variable lift and working-angle control mechanism 1 needs no element for biasing two elements toward each other such as a return spring. Accordingly, variable lift and working-angle control mechanism 1 is easily lubricated, resulting in enhancement in durability and in reliability.

On the other hand, variable phase control mechanism 21 is comprised of a sprocket 22 and a phase control hydraulic actuator 23. Sprocket 22 is provided at the front end of drive shaft 2. Variable phase control actuator 23 is provided to enable drive shaft 2 to rotate relative to sprocket 22 within a predetermined angular range. Sprocket 22 has a driven connection with the engine crankshaft through a timing chain (not shown) or a timing belt (not shown). In order to monitor or detect the angular position of drive shaft 2, drive shaft sensor 16 is located nearby drive shaft 2. Variable phase control actuator 23, which is a hydraulic or electro-magnetic rotary actuator, operates in response to a control signal from ECU 19. The relative rotation of drive shaft 2 to sprocket 22 in one rotational direction results in a phase advance of the central-angle phase at the maximum intake-valve lift point. The relative rotation of drive shaft 2 to sprocket 22 in the opposite rotation direction results in a phase retard of the central-angle phase at the maximum intake-valve lift point. In variable phase control mechanism 21 shown in FIG. 1, only the central-angle phase at the maximum intake-valve lift point (intake-valve open timing IVO and intake-valve closure timing IVC) is advanced or retarded, with no valve-lift change of intake valve 11 and no working-angle change of intake valve 11. The relative angular position of drive shaft 2 to sprocket 22 can be continuously varied within limits by means of variable phase control actuator 23, and thus the central-angle phase also can vary continuously.

As discussed above, the variable valve actuation mechanism incorporated in the system of the embodiment is constructed by both of variable lift and working-angle control mechanism 1 and variable phase control mechanism 21 combined to each other. With the variable valve actuation mechanism, it is possible to widely continuously vary the intake-valve lift characteristic, in particular, to widely continuously vary intake-valve open timing IVO and intake-valve closure timing IVC separately, by way of a combination of the variable lift and working-angle control and the variable phase control. In this embodiment, the valve lift characteristic includes two elements of the valve lift and the valve working angle in correlation each other. Accordingly, when the valve lift is relatively large and the valve working angle is also relatively large, the valve lift characteristic is referred to as "large". On the other hand, when the valve lift is relatively small and the valve working angle is also relatively small, the valve lift characteristic is referred to as "small". Alternatively, the size of valve lift characteristic may be the size of one of the valve lift and the valve working angle, the size of a vector including two elements of the valve lift and the valve working angle, or the integration of the valve lift with respect to the valve working angle.

Referring now to FIG. 2, there is shown a system block diagram of the intake system of the engine. An intake air passage 25 including a collector 26 and a plurality of intake-manifold branch passages connected at their downstream ends to the respective intake ports. Upstream to collector 26 in intake air passage 25 is provided an electronically-controlled throttle valve 27 to adjust the opening of intake-air passage 25 or to adjust the quantity of intake air flowing into the engine. Although it is not clearly shown in the drawing, electronically-controlled throttle valve unit 27 is comprised of a round-disk throttle valve, a throttle position sensor, and a throttle actuator that is driven by means of an electric motor such as a step motor. The throttle actuator adjusts the throttle opening in response to a control command signal from ECU 19. The throttle position sensor is provided to monitor or detect the actual throttle opening. The quantity of intake air supplied to a combustion chamber 28 of a cylinder is controlled by a combination of variable lift and working-angle control mechanism 1, variable phase control mechanism 21, and electronically-controlled throttle valve 27. A vehicle speed sensor 30 is provided to monitor a vehicle speed. An accelerator opening sensor 32 is provided to monitor or detect an amount of depression of an accelerator pedal depressed by the driver, that is, an accelerator opening. A crank-angle sensor (or a crankshaft position sensor) 33 is provided to inform the ECU of engine speed as well as the relative position of the engine crankshaft (i.e., a crank angle). A coolant temperature sensor 36 is provided to monitor a temperature of a coolant in the engine. A pressure sensor 37 is provided to monitor a pressure of the intake air in the intake manifold of intake-air passage 25. A brake switch 38 is provided to monitor an ON/OFF status of a brake pedal. Continuously variable transmission 31 is capable of continuously varying the gear ratio of which ECU 19 is informed. Continuously variable transmission 31 may be of the belt type or the toroidal type.

ECU 19 generally comprises a microcomputer, serving as a control unit to control the variable valve control system. ECU 19 includes an input/output interface (I/O), memories (RAM, ROM), and a microprocessor or a central processing unit (CPU). The input/output interface (I/O) of ECU 19 receives input information from engine/vehicle sensors as a sensing section, namely the throttle position sensor, vehicle speed sensor 30, continuously variable transmission 31, accelerator opening sensor 32, crank angle sensor 33, coolant temperature sensor 36, pressure sensor 37, brake switch 38, control shaft sensor 14, and drive shaft sensor 16. Within ECU 19, the central processing unit (CPU) allows the access by the I/O interface of input informational data signals from the previously-discussed engine/vehicle sensors. The CPU of ECU 19 is responsible for carrying the fuel-injection/ignition-timing/intake-valve lift characteristic/throttle control program stored in memories and is capable of performing necessary arithmetic and logic operations. Concretely, based on the input information, a fuel-injection amount and a fuel-injection timing of a fuel injection valve or an injector 35 for supplying fuel to combustion chamber 28 of each engine cylinder are controlled by an electronic fuel-injection control system. An ignition timing of a spark plug 34 for igniting an air-fuel mixture in combustion chamber 28 of each engine cylinder is controlled by an electronic ignition system. The throttle opening of electronically-controlled throttle valve 27 is controlled by the electronic throttle control system containing the throttle actuator operated responsively to the control command from ECU 19. On the other hand, the intake-valve lift characteristic is electronically controlled by means of the variable valve actuation mechanism, which is comprised of variable lift and working-angle control mechanism 1 and variable phase control mechanism 21. Computational results, that is, calculated output signals are relayed through the output interface circuitry of ECU 19 to output stages, namely the throttle actuator of electronically-controlled throttle valve 27, spark plugs 34, fuel injectors 35, a variable lift and working-angle control actuator 13 for variable lift working-angle control mechanism 1, and a variable phase control actuator 23 for variable phase control mechanism 21.

The control of variable lift and working-angle control mechanism 1 and variable phase control mechanism 21 may be implemented by a closed-loop control system using as a feedback the information from control shaft sensor 14 and drive shaft sensor 16, or by an open-loop control system in accordance with the engine operating condition.

Figure 3:
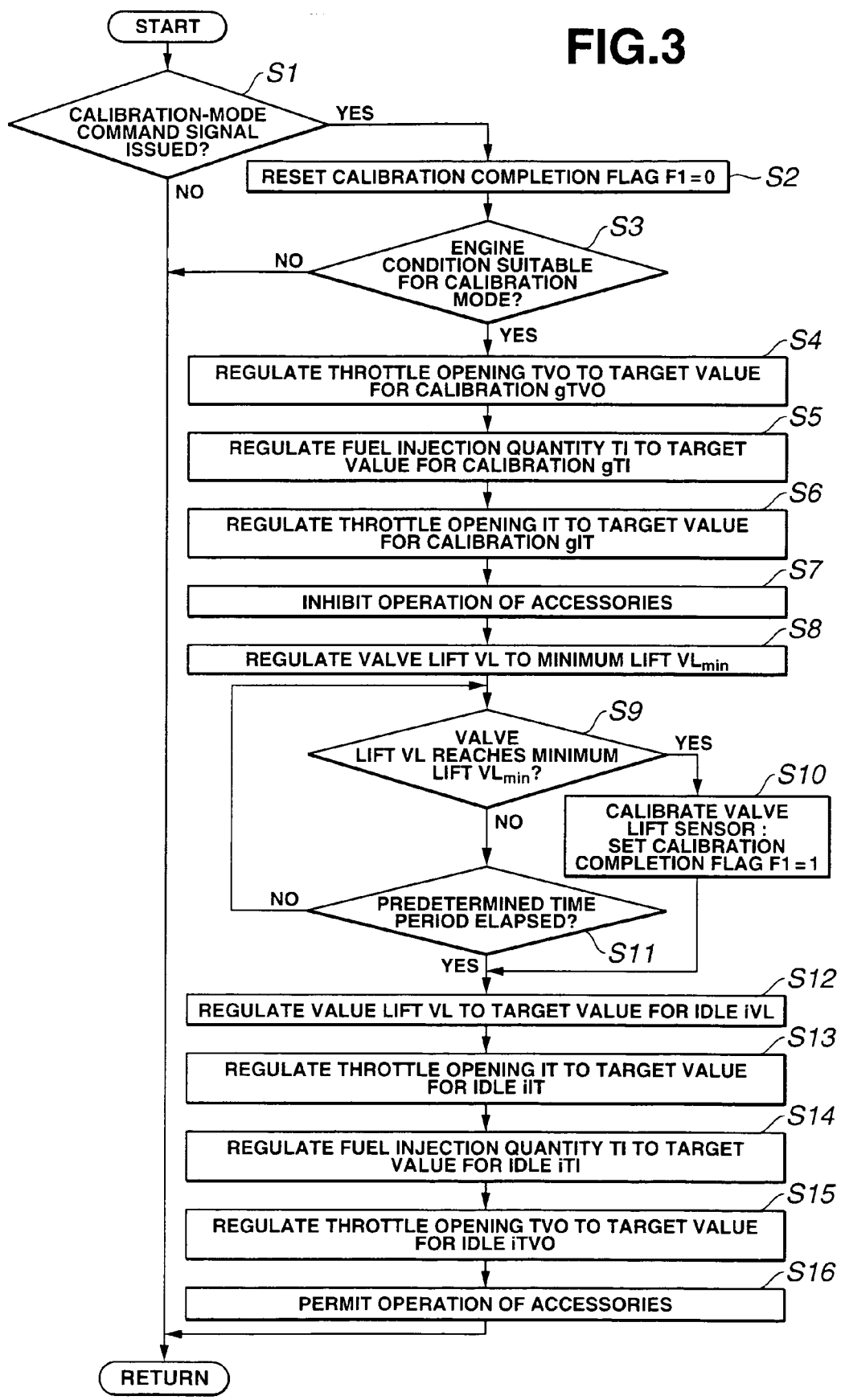
FIG. 3 is a flow chart depicting a process of calibrating a sensor for estimating the valve lift characteristic in accordance with the embodiment of the present invention.

The following describes a calibration mode in which the variable valve control system calibrates control shaft sensor 14 in accordance with an embodiment of the present invention. FIG. 3 is a flow chart depicting a routine executed by the variable valve control system. FIGS. 4A through 4F are time charts depicting changes in a calibration-mode command signal, a throttle opening TVO, a fuel injection quantity TI, an ignition timing IT, operational status of accessories, and a valve lift VL of intake valve 11, during the calibration mode. The calibration-mode command signal is an ON/OFF signal indicative of selection of the operating mode. The routine of FIG. 3 is repeatedly executed at intervals of a predetermined short time period such as 10 ms by ECU 19.

As shown in FIG. 3, first, at step S1, ECU 19 makes a check to determine whether or not the calibration-mode command signal is issued or present (ON status). The calibration-mode command signal is input from an external device such as an external diagnostic tool 40 in a maintenance shop. As shown in FIG. 2, diagnostic tool 40 is connected electrically to ECU 19 via a connector 41 mounted on the vehicle. Connector 41 serves as an input section to receive an externally input calibration-mode command. The calibration-mode command signal is input by operating a switch or a button of diagnostic tool 40. Diagnostic tool 40 is also used to input commands for diagnosis of the engine. During the calibration-mode command signal being absent, the engine is operated in a normal operating mode. When the answer to step S1 is affirmative (YES), the routine proceeds to step S2. On the other hand, when the answer to step S1 is negative (NO), the routine returns.

At step S2, ECU 19 resets a calibration completion flag F1 to 0. Subsequent to step S2, at step S3, ECU 19 makes a check to determine whether or not the engine condition is suitable for the calibration mode. ECU 19 is configured to employ the calibration mode only when the engine operating condition satisfies a predetermined requirement. Specifically, for example, ECU 19 makes a check to determine whether or not control shaft sensor 14 is normal. In addition, ECU 19 makes a check to determine whether or not the vehicle is at rest, whether or not the engine speed is in a predetermined low range, and whether or not the coolant temperature is equal to or lower than a predetermined threshold temperature. When all the above-mentioned conditions are satisfied, ECU 19 determines that the engine condition is ready for the calibration mode. When the answer to step S3 is YES, the routine proceeds to step S4. On the other hand, when the answer to step S3 is NO, the routine returns.

In order to prevent the engine speed from decreasing to an excessively low speed or zero, and to hold the engine speed stable, ECU 19 executes a sequence of steps S4 through S7 before reducing valve lift VL at step S8. ECU 19 controls the engine operating condition in a direction to stabilize combustion in combustion chamber 28, in response to the calibration-mode command. First, at step S4, ECU 19 regulates throttle opening TVO to a target opening gTVO for the calibration mode. Target opening gTVO is predetermined to be higher than a target opening iTVO for an idle mode in which the engine is at idle. At step S5, ECU 19 regulates fuel injection quantity TI to a target quantity gTI employed for the calibration mode. Target quantity gTI is predetermined to be larger than a target quantity iTI for the idle mode. In other words, a target air-fuel ratio for the calibration mode is predetermined to be richer than in the idle mode. At step S6, ECU 19 regulates ignition timing IT to a target timing gIT for the calibration mode. Target timing gIT is predetermined to be earlier than a target timing iIT for the idle mode. At step S7, ECU 19 halts or reduces an external load such as a load caused by the operation of accessories. For example, the accessory load is caused by a compressor for an air conditioner, a power steering unit, and an electrical load such as a defogger.

Subsequent to step S7, at step S8, ECU 19 regulates valve lift VL of intake valve 11 to a desired minimum value VLmin. Desired minimum lift VLmin is a small setting, or a minimum setting in this embodiment, which is mechanically defined by contact between control shaft 12 and a mechanical structure such as a stopper. ECU 19 controls the angular position of control shaft 12 to be a mechanically defined position corresponding to the mechanically defined minimum setting of valve lift VL. This is implemented by controlling valve lift VL in accordance with a target valve lift smaller than desired minimum lift VLmin. With this target, control shaft 12 is biased toward and stopped against the stopper so that valve lift VL is regulated to desired minimum lift VLmin. In this manner, even if there is an error between actual valve lift and an estimated valve lift at the lower mechanical limit position, which may be present before the recalibration operation, valve lift VL is regulated to be desired minimum lift VLmin. In this embodiment, idle-mode valve lift iVL, which is the minimum setting used as a target value of the control in the normal operating conditions, is about 1.5 mm. In order to secure a wide available range of the intake valve lift, minimum lift VLmin is determined to be smaller than idle-mode valve lift iVL, or equal to an ultrasmall value smaller than 1 mm.

Subsequent to step S8, at step S9, ECU 19 makes a check to determine whether or not valve lift VL is minimum lift VLmin. It may be determined in accordance with a change in the signal from control shaft sensor 14, a change in the estimated valve lift characteristic, or the quantity of intake air flowing into combustion chamber 28. When the answer to step S9 is YES, the routine proceeds to step S10. On the other hand, when the answer to step S9 is NO, the routine proceeds to step S11.

At step S10, ECU 19 calibrates control shaft sensor 14. The variable valve control system calibrates control shaft sensor 14 by correcting information concerning a reference position for measuring and outputting the angular position of control shaft 12. More specifically, ECU 19 reads an output signal from control shaft sensor 14 in a condition where control shaft 12 is in contact with the mechanical stopper. Then, ECU 19 stores the sensed value or the estimated angular position of control shaft 12 in a backup memory to update the sensor output corresponding to the reference position of control shaft 12, which is used to determine the relative angular position of control shaft 12 with respect to the reference position defined by the stopper, and to determine an estimated valve lift of intake valve 11. Finally, ECU 19 sets calibration completion flag F1 to 1. Thus, the variable valve control system relates the sensed value to the position of control shaft 12 by presenting the sensed value when control shaft 12 is in a known position such as a mechanical limit position. The known position is established by operating variable lift and working-angle control actuator 13 to rotate in a direction to position control shaft 12 toward the limit position until further rotation of control shaft 12 is not sensed, indicating control shaft 12 is at it's mechanical limit. Subsequent to step S10, the routine proceeds to step S12. Another routine for monitoring the operating status of the variable valve control system is executed so that a display of diagnostic tool 40 shows in accordance with calibration completion flag F1 that the calibration operation is completed.

At step S11, ECU 19 makes a check to determine whether or not a predetermined threshold time period is elapsed after the start of the calibration mode. When the answer to step S11 is YES, the routine proceeds to step S12. On the other hand, when the answer to step S11 is NO, the routine returns to step S9, terminating the calibration mode. This check limits the time period for the calibration operation. Therefore, if valve lift VL does not reach the mechanically defined minimum setting within the predetermined threshold time period, step S10 is skipped.

In order to shift the engine operating mode from the calibration mode to the idle mode again, ECU 19 executes a sequence of steps S12 through S16. First, at step S12, ECU 19 regulates valve lift VL to idle-mode target valve lift iVL. At step S13, ECU 19 regulates ignition timing IT to idle-mode target timing iIT. At step S14, ECU 19 regulates fuel injection quantity TI to idle-mode target quantity iTI. At step S15, ECU 19 regulates throttle opening TVO to idle-mode target opening iTVO. At step S16, ECU 19 cancels the halt or the reduction of the external load which is executed at step S7. Subsequent to step S16, the routine returns.

In accordance with the above-mentioned process, the variable valve control system calibrates control shaft sensor 14 in the calibration mode in which valve lift VL is minimum lift VLmin, only when ECU 19 receives the calibration-mode command from an external input device such as diagnostic tool 40. This avoids an unstable combustion during the engine operating in normal operating conditions, because the calibration operation is not performed during the normal engine operating conditions.

In addition, in the calibration mode, the engine is operated in a condition where throttle opening TVO is larger, fuel injection quantity TI is larger (the air-fuel ratio is richer), ignition timing IT is earlier, and the external load is lower than in the idle mode. This prevents a large decrease in the engine speed or the stall of the engine. Accordingly, the engine is smoothly operated with stability in the calibration mode in which the valve lift characteristic is the minimum setting. With the smooth engine operation, the variable valve control system regulates valve lift VL of intake valve 11 to the mechanically defined minimum setting and calibrates control shaft sensor 14.

In the above-mentioned embodiment, at step S10, the variable valve control system stores the sensed value corresponding to the lower mechanical limit position in the backup memory. Alternatively or in addition, the variable valve control system may store the sensed value in a temporary memory, and use the stored value as a correction value.

In the above-mentioned embodiment, control shaft sensor 14 is employed as a valve lift sensor, to detect the angular position of control shaft 12, and thereby to serve for determining valve lift VL of intake valve 11, and is calibrated by the variable valve control system. Alternatively, the variable valve control system may employ and calibrate any device for directly or indirectly determining the valve lift characteristic of intake valve 11, such as a sensor to directly detect valve lift VL of intake valve 11.

In the above-mentioned embodiment, the variable valve control system is configured to control the intake valve. However, the variable valve control system is also applicable to a valve to open and close an opening of a combustion chamber of the engine such as an exhaust valve.

In the above-mentioned embodiment, the variable valve control system is configured to calibrate variable lift and working-angle control mechanism 1. However, the variable valve control system is also applicable to variable phase control mechanism 21, that is, the phase of the intake valve or the exhaust valve.

As discussed above, in response to such a calibration-mode command signal as from an external diagnostic tool during maintenance operation in a maintenance shop, the variable valve control system of the embodiment calibrates the valve lift sensor in the calibration mode in which the valve lift characteristic is adjusted to the mechanically defined minimum setting. Thus, the variable valve control system is capable of canceling a secular decrease in precision of estimated valve lift characteristics. In addition, the variable valve control system avoids a decrease in combustion stability in normal driving conditions, because the calibration operation including the operation of adjusting the valve lift to the mechanically defined minimum setting is not executed in normal driving conditions.

This application is based on a prior Japanese Patent Application No. 2004-119797 filed on Apr. 15, 2004. The entire contents of this Japanese Patent Application No. 2004-119797 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable valve control system for an internal combustion engine, comprising:
   a valve to open and close an opening of a combustion chamber of the engine;
   a variable lift characteristic control mechanism to adjust a valve lift characteristic of the valve;
   a sensing section to collect information needed to determine an estimated valve lift characteristic of the valve;
   an input section to receive an externally input calibration-mode command; and
   a control unit in operative communication with the variable lift characteristic control mechanism, the sensing section, and the input section, to perform the following:
      controlling the valve lift characteristic to be a mechanically defined small setting in response to the calibration-mode command;
      collecting the information when the valve lift characteristic is the small setting; and
      calibrating the sensing section in accordance with the collected information.

2. The variable valve control system as claimed in claim 1, wherein the variable lift characteristic control mechanism is configured to continuously adjust the valve lift characteristic of the valve.

3. The variable valve control system as claimed in claim 1, wherein the valve lift characteristic includes at least one element of a valve lift and a working angle in correlation with each other.

4. The variable valve control system as claimed in claim 1, wherein the variable lift characteristic control mechanism comprises a control shaft whose angular position determines the valve lift characteristic, wherein the sensing section comprises a control shaft sensor to determine the angular position of the control shaft, and wherein the control unit is configured to perform the following:
   controlling the angular position to be a mechanically defined position corresponding to the small setting of the valve lift characteristic in response to the calibration-mode command;
   determining an estimated angular position of the control shaft sensor when the angular position is the mechanically defined position; and
   calibrating the control shaft sensor in accordance with the estimated angular position.

5. The variable valve control system as claimed in claim 4, wherein the variable lift characteristic control mechanism comprises:
   a drive shaft driven by a crankshaft of the internal combustion engine;
   a drive eccentric cam having an axis eccentric to an axis of the drive shaft;
   a control shaft having an axis extending along the axis of the drive shaft;
   a control eccentric cam including an axis eccentric to the axis of the control shaft;
   a valve rocker arm rockably supported on the control eccentric cam;
   a rockable cam in contact with each of the intake valve;
   a link member mechanically linking one end portion of the valve rocker arm and the rockable cam; and
   a link arm mechanically linking another end portion of the valve rocker arm and the drive eccentric cam.

6. The variable valve control system as claimed in claim 1, wherein the input section is configured to be connected to an external diagnostic tool for inputting the calibration-mode command.

7. The variable valve control system as claimed in claim 1, wherein the small setting is smaller than a minimum setting of the valve lift characteristic in a normal operating mode which is employed during the calibration-mode command being absent.

8. The variable valve control system as claimed in claim 1, wherein the small setting is a mechanically defined minimum setting, and wherein the control unit is configured to control the valve lift characteristic in accordance with a target smaller than the small setting, in response to the calibration-mode command.

9. The variable valve control system as claimed in claim 1, wherein the control unit is configured to control an operating condition of the engine in a direction to stabilize combustion in the combustion chamber, in response to the calibration-mode command.

10. The variable valve control system as claimed in claim 1, further comprising a throttle valve to adjust a quantity of intake air flowing into the engine, wherein the control unit is in operative communication with the throttle valve, and is configured to control a throttle opening of the throttle valve to be larger than in an idle mode in which the engine is at idle, in response to the calibration-mode command.

11. The variable valve control system as claimed in claim 1, further comprising a fuel injector to supply fuel to the combustion chamber, wherein the control unit is in operative communication with the fuel injector, and is configured to control a fuel injection quantity of the fuel to be larger than in an idle mode in which the engine is at idle, in response to the calibration-mode command.

12. The variable valve control system as claimed in claim 1, further comprising a spark plug to ignite an air-fuel mixture in the combustion chamber, wherein the control unit is in operative communication with the spark plug, and is configured to control an ignition timing to be earlier than in an idle mode in which the engine is at idle, in response to the calibration-mode command.

13. The variable valve control system as claimed in claim 1, wherein the control unit is configured to control an external load to be smaller than in an idle mode in which the engine is at idle, in response to the calibration-mode command.

14. A variable valve control system for an internal combustion engine, comprising:
   a valve to open and close an opening of a combustion chamber of the engine;
   a variable lift characteristic control mechanism to adjust a valve lift characteristic of the valve;
   a sensing section to collect information needed to determine an estimated valve lift characteristic of the valve;
   an input section to receive an externally input calibration-mode command; and
   a control unit in operative communication with the variable lift characteristic control mechanism, the sensing section, and the input section, to operate the engine in a calibration mode in response to the calibration-mode command, and to perform the following in the calibration mode:
      controlling the valve lift characteristic to be a mechanically defined small setting;
      collecting the information when the valve lift characteristic is the small setting; and
      calibrating the sensing section in accordance with the collected information.

15. The variable valve control system as claimed in claim 14, wherein the control unit is configured to employ the calibration mode only when an operating condition of the engine satisfies a predetermined requirement.

16. The variable valve control system as claimed in claim 15, for the internal combustion engine of a vehicle, wherein the sensing section comprises a vehicle speed sensor to measure a vehicle speed of the vehicle, and wherein the control unit is configured to employ the calibration mode only when the vehicle is at rest.

17. The variable valve control system as claimed in claim 15, wherein the sensing section comprises a sensor to measure an engine speed of the engine, and wherein the control unit is configured to employ the calibration mode only when the engine speed is low.

18. The variable valve control system as claimed in claim 15, wherein the sensing section comprises a temperature sensor to measure a temperature of a coolant within the engine, and wherein the control unit is configured to employ the calibration mode only when the coolant temperature is low.

19. The variable valve control system as claimed in claim 14, wherein the control unit is configured to perform the following:
   determining whether or not the valve lift characteristic is the small setting; and
   terminating the calibration mode if a predetermined time period is elapsed after the start of the calibration mode until it is determined that the valve lift characteristic is the small setting.

20. The variable valve control system as claimed in claim 19, wherein the control unit is configured to determine in accordance with a change in the estimated valve lift characteristic whether or not the valve lift characteristic is the small setting.

21. The variable valve control system as claimed in claim 19, wherein the control unit is configured to determine in accordance with a change in a quantity of intake air flowing into the combustion chamber whether or not the valve lift characteristic is the small setting.

22. A variable valve control system for an internal combustion engine, comprising:
   a valve to open and close an opening of a combustion chamber of the engine;
   variable lift characteristic control means for adjusting a valve lift characteristic of the valve;
   sensing means for collecting information needed to determine an estimated valve lift characteristic of the valve;
   input means for receiving an externally input calibration-mode command; and
   control means in operative communication with the variable lift characteristic control means, the sensing means, and the input section, for performing the following:
      controlling the valve lift characteristic to be a mechanically defined small setting in response to the calibration-mode command;
      collecting the information when the valve lift characteristic is the small setting; and
      calibrating the sensing means in accordance with the collected information.

* * * * *